May 5, 1970  G. J. TOPOL  3,510,666
TURBIDITY METER HAVING CALIBRATING LIGHT SOURCE
Filed May 5, 1967  3 Sheets-Sheet 1

INVENTOR.
GEORGE J. TOPOL
BY
Jeffers and Young
ATTORNEYS

INVENTOR.
GEORGE J. TOPOL

United States Patent Office 3,510,666
Patented May 5, 1970

3,510,666
TURBIDITY METER HAVING CALIBRATING LIGHT SOURCE
George J. Topol, Hamilton, Ontario, Canada, assignor to Bowser, Inc., Cookeville, Tenn., a corporation of Indiana
Filed May 5, 1967, Ser. No. 636,431
Int. Cl. G01n 21/12
U.S. Cl. 250—218                                      6 Claims

ABSTRACT OF THE DISCLOSURE

Two light sensitive devices, a light source, and a shield are arranged along the path of a fluid whose turbidity is to be measured. One light sensitive device receives only scattered light from the source and the other light sensitive device receives both scattered and directly transmitted light from the source. The ratio of the electrical outputs of the two light sensitive devices is supplied to an indicating meter which provides a linear indication of turbidity over a relatively wide range.

BACKGROUND OF THE INVENTION

My invention relates to an improved turbidity meter, and particularly to a turbidity meter that measures the turbidity or coloration of a fluid over a relatively wide range.

Turbidity meters are used in many applications for indicating the coloration in liquids or gases, for indicating the amount of suspended solids or contaminants in liquids or gases, and for other indications. Two types of turbidity meters have been used. The first type operates with scattered light. In such a turbidity meter, the light sensitive device does not receive light directly from the light source, but receives light which is scattered by the particles or foreign matter or contaminants in the fluid whose turbidity is being measured. As the concentration of the particles increases, most of the scattered light becomes absorbed by intervening particles. Hence, such a turbidity meter gives a linear response only for a relatively low range of turbidity. At high turbidity levels, the response actually reverses and further increases in turbidity cause a decreased meter reading. The second type of turbidity meter operates with directly received light. In this meter, the light sensitive device is positioned so that it can receive light directly from the light source. As the turbidity increases, less directly transmitted light is received by the light sensitive device. The response of the second type of device is also not linear. The meter deflection is highest for clear fluids, and this deflection decreases with increasing turbidity. For extremely high turbidities, the deflection will be nearly zero. When the turbidity is very low, the meter shows practically full-scale detection, so that the small difference from full deflection (clear fluid) is difficult to read. A similar difference can be caused by other factors, such as darkening of the light bulb, voltage drop, photocell drift, or coating of windows by dirt deposits. Consequently, the reading of the second type of device is unreliable for low levels of turbidity. However, the second or directly transmitted light device responds well to higher levels of turbidity. The response is not linear, but, theoretically, follows Beer's Law. This Law states that an equal increment of suspended particles in a liquid causes an equal percentile reduction in the amount of light transmitted through the liquid. For example, assume that a certain amount of suspended particles in a liquid reduces the transmitted light to 50% of its original value. If the amount of particles is then doubled, the transmitted light is reduced to 25% of its original value. From this relationship, the meter reading of the second type of device could be converted fairly accurately to turbidity. Unfortunately, this second type of device also detects some of the light scattered by the suspended particles. This causes a significant and unpredictable error.

Since the scattered light turbidity meter lends itself to low turbidities and since the directly transmitted light turbidity meter lends itself to relatively high turbidities, it is desirable to combine the two meters and produce a linear indication of turbidity over a relatively wide range.

Accordingly, an object of my invention is to provide an improved turbidity meter utilizing directly transmitted light and scattered light to provide a turbidity meter having a relatively wide range.

Another object of my invention is to provide an improved turbidity meter that utilizes directly transmitted light and scattered light, but that is relatively simple and easy to calibrate and operate.

Another object of my invention is to provide an improved turbidity meter having two light sensitive devices, one of which receives light directly and the other of which receives scattered light, and having means for combining the outputs of the two light sensitive devices into a single meter.

Another object of my invention is to provide an improved turbidity meter having two light sensitive devices, one of which receives light directly and the other of which receives scattered light, and further having means for combining the outputs of the two light sensitive devices into a single meter that provides a relatively accurate indication of turbidity over a relatively wide range.

SUMMARY OF THE INVENTION

Briefly, these and other objects are achieved in accordance with my invention by a housing through which the fluid to be measured passes. A light source, a shield, and two light sensitive devices are positioned in the housing so that one light sensitive device receives directly transmitted light from the source and scattered light from the particles in the fluid, and so that the other light sensitive device receives only scattered light from the particles. The outputs of the two light sensitive devices are combined as a ratio of the scattered light sensitive device output to the transmitted light sensitive device output. I have found that this ratio is substantially linear over a relatively wide range of turbidities, and that the outputs of the two light sensitive devices may be utilized to provide an accurate indication of turbidity over this relatively wide range. If desired, this ratio may be provided electrically by an operational amplifier so no calculations or operations are necessary.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

Figure 1:
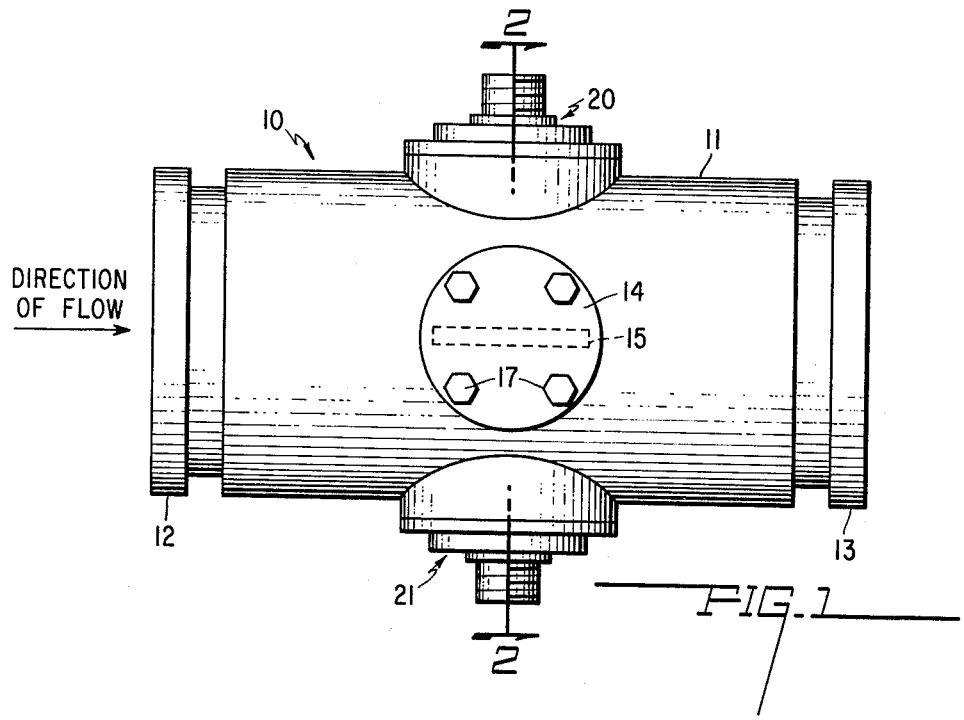
FIG. 1 shows a housing containing a light source, a shield, and light sensitive devices for measuring the turbidity of a fluid in accordance with my invention.

FIG. 1 shows a plan view of a turbidity meter housing 10 incorporating my invention. In the embodiment to be described, it has been assumed that the fluid turbidity is to be measured in a liquid that flows in a cylindrical pipe in the direction of flow indicated by the arrow in FIG. 1. Consequently, for this assumed example, the housing 10 is provided with a cylindrical member 11 having flanged ends 12, 13 for connection into the pipe carying the liquid. It is to be understood that members of other shapes can be substituted for the cylindrical member 11. The cylindrical member 11 is provided with an opening in its top, and a plate 14 carrying a light shield or vane 15 is positioned over this opening to provide a water-tight connection. The plane of the vane 15 is preferably positioned parallel to the direction of flow so that the pressure drop and turbulence are minimized. The plate 14 may be provided with a gasket 16 and is attached to the member 11 in any suitable manner, as by bolts 17. I have found that the removable plate 14 is preferred in order that the light shield 15 may be replaced or adjusted. At the same longitudinal point along the member 11, two electrical connecting members or elements 20, 21 are provided. As seen best in FIG. 2, which is an enlarged cross-sectional view taken along the lines 2—2 in FIG. 1, the electrical connecting elements 20, 21 are positioned approximately 90° around the circumference of the member 11 from the plate 14. Thus, the elements 20, 21 are substantially diametrically opposite each other. The element 20 provides optical access to the interior of the member 11 through a transparent window 22 which is made of glass or plastic and which is positioned in an opening in the member 11 and sealed with a water-tight connection. An operating light 23 and a calibrating light 24 are positioned behind or outside of the window 22, and mounted in holes or recesses in a cover piece 26. Electrical leads or connections for the lights 23, 24 are provided and brought out through any suitable type of connection member 30 for connection to an indicating or meter circuit. These leads include an operating light lead 27, a common lead 28, and a calibrating light lead 29. The element 21 is similar in construction, and has a transparent window 33 positioned in an opening in the member 11 with a water-tight connection. The window 33 is also glass or plastic. A scattered light sensitive device or cell 34 and a transmitted light sensitive device or cell 35 are positioned behind or outside the window 33. The scattered light cell 34 is preferably positioned directly against the window 33, but the transmited light cell 35 is preferably set back slightly from the window 33 as shown, as I have found that this provides a more linear response. The light cells 34, 35 may be any suitable light sensitive device, but I prefer to use light sensitive devices whose impedance or direct current resistance varies inversely with the amount of light received. Or expressed in another way, the conductances of the light cells 34, 35 vary as a function of the light received. If more light is received, the conductance of the cells 34, 35 increases. The cells 34, 35 are shielded from each other by being mounted in holes or recesses in a cover 37. Leads 38 for the scattered light cell 34 and leads 39 for the transmitted light cell 35 are brought out through an electrical connector 40 for connection to the meter or indicating circuit.

Figure 2:
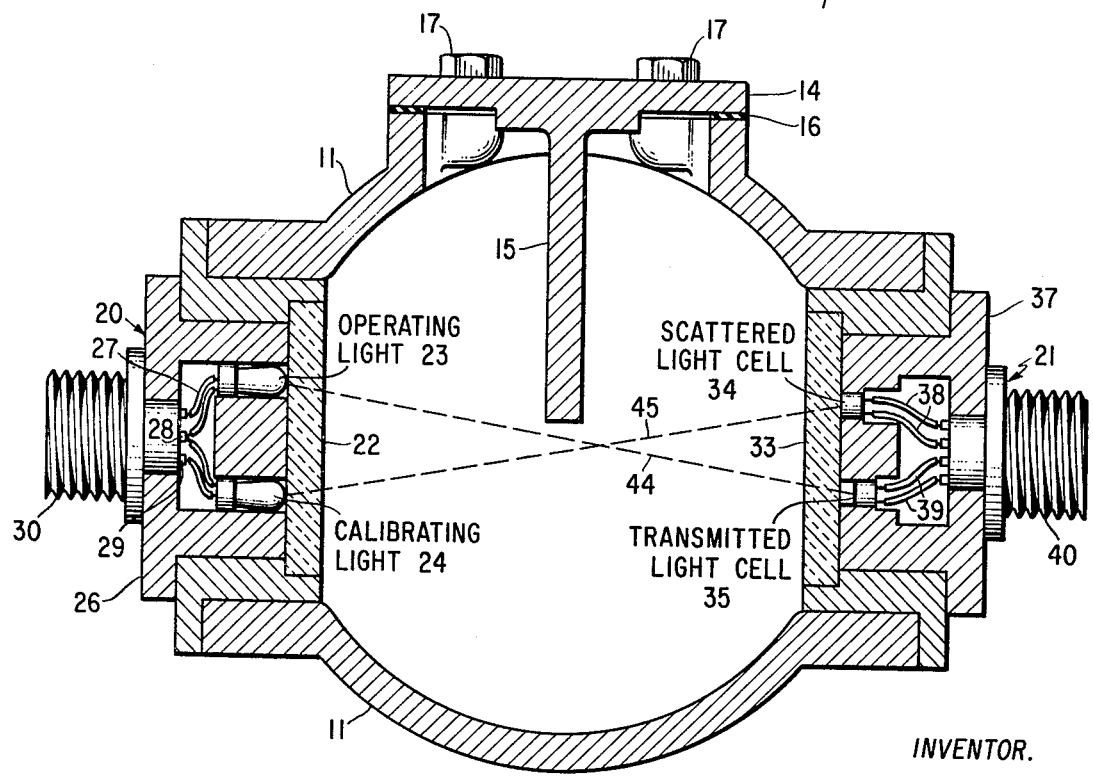
FIG. 2 shows a cross-sectional view of the housing and its components taken along the lines 2—2 in FIG. 1.

FIG. 2 shows the approximate construction and location of the lights 23, 24, the shield 15, and the cells 34, 35. This arrangement is such that when the operating light 23 is illuminated, the shield 15 permits directly transmitted light rays, indicated by the dashed line 44, to reach only the transmitted light cell 35. The only light received by the scattered light cell 34 from the operating light 23 is through light scattered by particles in the liquid in the member 11. However, when the calibrating light 24 is illuminated, light from this light 24 can, as shown by the dashed line 45, reach both the scattered light cell 34 and the transmitted light cell 35. This calibrating light 24 is provided in order to calibrate the turbidity meter as will be described. I prefer that the interior surfaces of the member 11 and the surfaces of the shield 15 be nonreflective, and I achieve this by a suitable black paint or black covering. The windows 22, 23 are not covered, of course.

Figure 4:
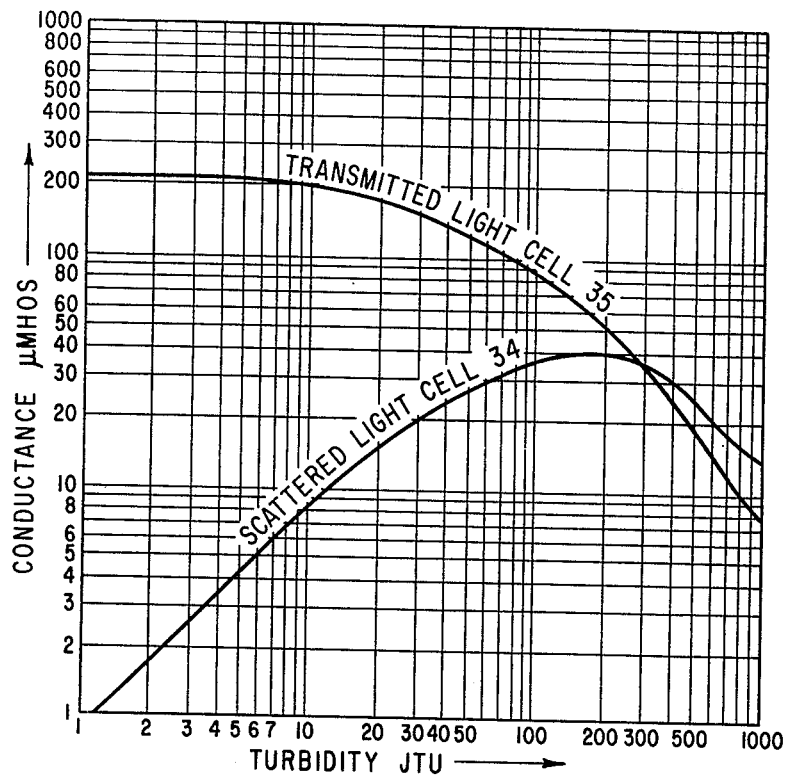
FIG. 4 shows the individual outputs of the light sensitive devices in accordance with my invention plotted against turbidity.
Figure 5:
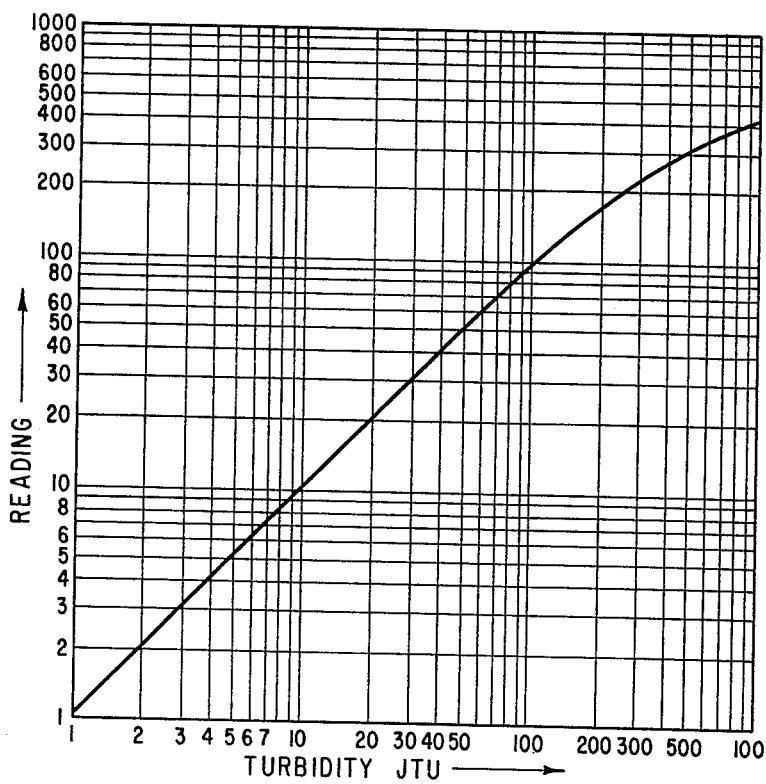
FIG. 5 shows the ratio of the outputs of the two light sensitive devices in accordance with my invention plotted against turbidity.

When the turbidity meter described in connection with FIGS. 1 and 2 is in operation with a liquid flowing through the member 11, the scattered light cell 34 and the directly transmitted light cell 35 have responses shown in FIG. 4. FIG. 4 is a graph showing how the conductances of the cells in micromhos varies with turbidity in Jackson turbidity units (J.t.u.'s). It will be noted that both responses are complex. The scattered light cell 34 starts losing its linearity in the neighborhood of 10 J.t.u.'s, and gradually flattens and reaches a maximum at approximately 200 J.t.u.'s. Beyond 200 J.t.u.'s, the slope reverses and decreases. The transmitted light cell has a nearly constant output through approximately 10 J.t.u.'s and thereafter decreases along a nonlinear curve. The two curves shown in FIG. 4 illustrate how the responses of transmitted light cells and scattered light cells are nonlinear over a wide range of turbidities. Hence, it is difficult to obtain a meaningful indication of turbidity, even with a chart such as shown in FIG. 4. An operator, usually a skilled one, must read the indications of the scattered or transmitted light cells 34, 35, and then utilize the chart to determine the turbidity. However, I have found that if the conductivity of the scattered light cell 34 is divided by the conductivity of the transmited light cell 35, a ratio may be derived which is substantially linear over a relatively wide range of turbidities. FIG. 5 shows how this ratio as a meter reading varies with turbidity in J.T.u.'s. In FIG. 5, it will be seen that the ratio is extremely linear between 1 and 100 J.t.u.'s, and is still fairly linear between 100 and 500 J.t.u..'s. Such a linear relationship permits direct meter readings of turbidity over a relatively wide range.

Figure 3:
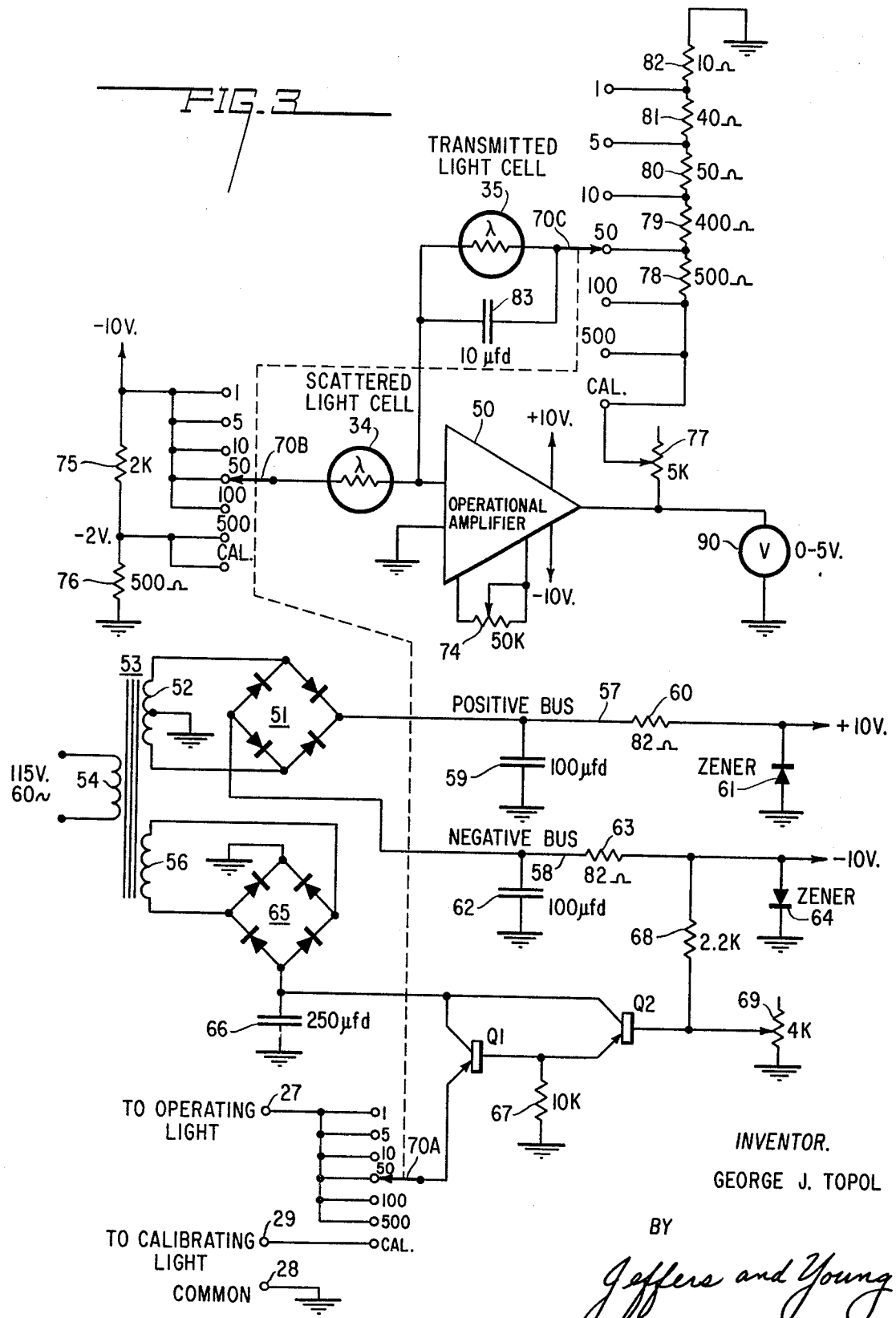
FIG. 3 shows an electrical circuit in accordance with my invention for providing a ratio of the scattered light sensitive device output to the transmitted light sensitive device output.

In order to achieve this division or ratio, I have provided the electrical circuit shown in FIG. 3. In accordance with my invention, this circuit uses a conventional operational amplifier 50. Power for my circuit, in this case direct current of +10 volts and −10 volts, is provided by a bridge rectifier 51 having its input terminals connected to the secondary winding 52 of a transformer 53. The center tap of the secondary winding 52 is connected to a point of reference potential or ground. The primary winding 54 of the transformer 53 is connectec to a suitable source of power, in this case 115 volts, 60 cycles. The output terminals of the bridge rectifier 51 are connected to a positive bus 57 and a negative bus 58. The positive bus 57 is provided with a filter capacitor 59 and resistor 60. The positive 10 volts is regulated by a Zener diode or rectifier 61. Likewise, the negative bus 58 is provided with a filter capacitor 62 and resistor 63, and is regulated with a Zener diode or rectifier 64. The +10 volts and −10 volts are connected to the circuit at the various points indicated. The power supply also provides a regulated current for the operating light 23 and the calibrating light 24. This regulated current is provided by a bridge rectifier 65 having its input terminals connected to a secondary winding 56 of the transformer 53. One of the output terminals of the bridge rectifier 65 is connected to the point of reference potential or ground. The other output terminal of the bridge rectifier 65 is connected through a filter capacitor 66 to ground, and is also connected to the collectors of the two PNP type transistors Q1 and Q2. The transistor Q1 provides the current path for the lights, and has its emitter connected to a movable arm 70A of a multi-section switch. The arm 70A has seven contacts. The first six contacts are connected through the lead 27 to the operating light, and the seventh contact is connected through the lead 29 to the calibrating light. The common lead 28 for the light is also shown. The switch includes two other sections having arms 70B and 70C, each of which has seven associated contacts. The arms 70A, 70B, and 70C operate together on a common shaft as indicated by the dashed lines. The base of the transistor Q1 is coupled through a resistor 67 to ground, and is also coupled to the emitter of the transistor Q2. The base of the transistor Q2 is coupled through a resistor 68 to the −10 volt bus and is also coupled through a potentiometer 69 to ground. The setting of the potentiometer 69 determines the base voltage for the transistor Q2. Since both transistors Q1 and Q2 act as emitter followers, the setting of the potentiometer 69 determines the voltage supplied to the operating light or the calibrating light.

In the upper portion of my circuit, the operational amplifier 50 is supplied with + and −10 volts as indicated. A balance potentiometer 74 is connected to the operational amplifier 50. One input terminal of the operational amplifier 50 is connected to ground, and the other input terminal of the amplifier 50 is connected to the scattered light cell 34. (The light cell 34 and the light cell 35 are indicated by a resistor and the symbol lambda.) The other terminal of the light cell 34 is connected to the arm 70B of the switch. The first five contacts associated with the arm 70B are connected to the −10 volts, and the sixth and seventh contacts are connected to the junction of a voltage divider network comprising the resistors 75, 76 connected between −10 volts and ground. The output terminal of the operational amplifier 50 is coupled through a calibrating potentiometer 77. The movable arm of this potentiometer 77 is connected to the fifth, sixth and seventh contacts associated with the arm 70C of the ganged switch. A voltage divider network comprising resistors 78, 79, 80, 81, 82 is connected between the arm of the potentiometer 77 and ground. The first four contacts associated with the arm 70C are connected to the junctions between adjacent pairs of the resistors 78, 79, 80, 81, 82. The movable arm 70C is connected through the transmitted light cell 35 to the input terminal of the amplifier 50. The light cell 35 is supplied with a bypass capacitor 83.

As is known in the art, the operational amplifier 50 functions so that the following relation is provided:

$$e_o = e_i \frac{G_i}{G_f} \quad (1)$$

In Equation 1, $e_o$ is the output voltage of the amplifier 50, $e_i$ is the input voltage of the amplifier 50, $G_i$ is the input conductance connected to the input of the operational amplifier 50, and $G_f$ is the feed-back conductance connected between the output and the input of the operational amplifier. With respect to FIG. 3, the input conductance $G_i$ is actually the conductance of the scattered light cell 34. In Equation 1, $G_i$ can be replaced by $G_s$, which is the conductance of the scattered light cell 34. The effective feed-back conductance $G_f$ of Equation 1 can, by reference to FIG. 3, be replaced by the conductance $G_T$ of the transmitted light cell 35, multiplied by the portion of the output voltage $e_o$ appearing at the arm 70C of the switch. This portion of the output voltage $e_o$ is determined by the position of the arm 70C of the switch and by the setting of the calibration potentiometer 77. If K represents the ratio of the feed-back voltage appearing on the arm 70C divided by the output voltage $e_o$, equation 1 can be rewritten as follows:

$$e_o = e_i \frac{G_S}{G_T K} \quad (2)$$

From Equation 2, it will be observed that the conductivity $G_S$ of the scattered light cell 34 is divided by the conductivity $G_T$ of the transmitted light cell 35. Thus, the circuit of FIG. 3 provides the division of the two conductivities, so that the output voltage varies as the ratio of the conductivity $G_S$ to the conductivity $G_T$. From FIG. 4, it will be seen that the conductivity $G_S$ initially increases with turbidity, and that the conductivity $G_T$ decreases with turbidity. Hence, in order that a voltmeter 90 connected to the output of the amplifier 50 may be kept on scale, the feed-back conductivity ($G_T K$) is varied through the factor K. This is achieved by the movable arm 70C which can engage a selected contact. In FIG. 3, the contacts associated with each of the movable arms 70A, 70B, and 70C have been labeled with the range in J.t.u.'s which are being read by the meter 90. Thus, with the arm 70C (and the other two arms 70A and 70B) engaging the uppermost contact, the range of J.t.u.'s is from 0 to 1. Thus, the feed-back voltage is determined by a voltage divided consisting of a resistor 82 (10 ohms) on one side and the sum of the resistor 81, 80, 79, 78, and the resistance of the potentiometer 77 on the other side. Since the resistor 82 is very small compared to the remaining resistors in series, the feedback voltage of the arm 70C and the ratio K are low. This results, according to Equation 2, in highest output (sensitivity). With the arm 70C engaging the contact for 50 J.t.u.'s, as shown in FIG. 3, the resistance on one side of the divider consists of a series resistance of the resistors 82, 81, 80, and 79, while the total resistance of the voltage divider remains the same as before. The amounts to 500 ohms which is 50 times higher than in combined resistance of resistors 82, 81, 80 and 79 the case of 1 J.t.u. setting. As a result, the sensitivity is reduced by a factor of 50. Thus, the resistors 78, 79, 80, 81, 82 enable the same voltmeter 90 to be used over a wide range of turbidities. In addition to the ratio described earlier, FIG. 5 also shows the meter readings which were obtained in an actual circuit constructed with the values indicated in FIG. 3 and with a voltmeter having a range of 0 to 5 volts. Thus, the circuit of FIG. 3 achieves the division of scattered light conductivity by transmitted light conductivity, and provides a linear indication of turbidity over a wide range of J.t.u.'s. The highest turbidity range (lowest sensitivity) is supplied by reducing the input voltage $e_i$ in Equation 2, from 10 volts to 2 volts (arm 70B in position 500).

Any photometric turbidity meter will exhibit drifts from its original calibration. These may be caused by effects of voltage variation, temperature, aging, sight glass coating, or other reasons. For this reason, provision has to be made for periodic recalibration. A basic method is filling the turbidity meter with a liquid of known turbidity and adjusting the reading to that level. A substitute for this tedious method is insertion of a reflectance rod or absorption filter, which simulates certain turbidity. The meter of my invention uses a calibrated aperture representing a turbidity of 15 J.t.u.'s. The arms 70A, 70B, and 70C of the switch also include a calibration contact, which is provided in order to calibrate the circuit. Calibration may be accomplished by setting the arms to the calibrate position, which causes the calibrating light 24 to be turned on. Both the scattered light cell 34 and the transmitted light cell 35 receive substantially equal amounts of light, and the meter shows the photocell output ratio. Illumination by the calibration bulb actually simulates a fictitious turbidity condition against which the instrument can be calibrated. The calibration is independent of color and can be performed on clear liquid as well as with turbid liquid present in the sensor. The calibration potentiometer 77 is adjusted so that a predetermined reading is provided on the meter 90. This method of calibration of my device permits remote calibration from a distance, and simplifies the procedure. Calibration can be done without interrupting the flow and it is not necessary that the liquid be clear. The turbidity meter can be calibrated on any liquid, as long as the turbidity is within the operating range of the instrument.

The relative position of the operating light bulb, light shield and the two cells, has been experimentally determined to produce a most linear relationship between the Jackson Turbidity and the meter reading. Since the color, light bulb aging, or sight glass coating will affect both cells equally, the illumination ratio will remain, essentially, constant. For this reason, the instrument should theoretically require no recalibrating. However, factors such as uneven coating of sight glass, electronic drifts, or uneven aging of photocells, might create reading errors.

It will thus be seen that my invention provides an improved turbidity meter which has a linear response over a relatively wide range of turbidity. Both the scattered light and the transmitted light meters are affected by the color of the liquid. If the length, or light path through the liquid is the same for the scatter and transmittance turbidity meter, the same color density of the liquid will reduce output signals of each turbidity meter by the same percentage (assuming that identical photocells are used). In my turbidity meter, the length of the light path, and the photocells, is, essentially, identical. Consequently, by reading the ratio of scattered to transmitted light, the effect of color is eliminated. Similarly, changes in light intensity, due to voltage fluctuation, light bulb aging, or sight glass window coating, are compensated for. My turbidity meter takes full advantage of sensitivity of the light-scattering principle for low turbidities, and of the high turbidity range for the transmitted light principle. The measurement of signal ratio compensates for non-linearities of each approach and provides an essentially linear response over a wide turbidity range. In practice and as shown in FIG. 5, the meter provides linear and reliable readings between 0 and 600 J.t.u.'s, and further provides a fairly linear reading between 600 and 1,000 J.t.u.'s. The indicating portion of my turbidity meter may be remtoely located from the sensing portion, so that control or indication of turbidity may be indicated at any desired point without the necessity of an operator actually being at the location of the liquid whose turbidity is to be measured. The calibration may also be made and checked from a remote location. Persons skilled in the art will appreciate that modifications may be made to my invention. For example, other types of light sensitive devices may be used in place of the photoconductive devices which I prefer. Also, other types of circuits may be provided in order to achieve the division of the scattered light cell conductivity by the transmitted light cell conductivity. And, my meter may be used with liquids and gases, both with all types of turbidity. Therefore, while my invention has been described with reference to a particular embodiment, it is to be understood that modifications may be made without departing from the spirit of my invention or from the scope of the claims.

What I claim as new and desire to secure by Letters Patent of the United States is:

1. A device for sensing the turbidity of a liquid and the like comprising:
   (a) a chamber having closed sidewalls forming a path along which said liquid may pass;
   (b) a first light source positioned on one of said sidewalls for emitting light into said chamber in the general direction of an opposite sidewall;
   (c) first and second photoconductive devices positioned on said opposite sidewall for receiving light in said chamber in the general direction from said one sidewall;
   (d) light shielding means comprising a vane mounted on a sidewall between said one sidewall and said opposite sidewall with the plane of said vane oriented parallel to said liquid path, said shielding means being arranged so that light from said first source may impinge on said first photoconductive device along a straight line and so that light from said first source is prevented from impinging on said second photoconductive device along a straight line;
   (e) electrical leads coupled to said photoconductive devices for connecting said photoconductive devices in an electrical circuit; and
   (f) a second light source positioned on one of said sidewalls to directly illuminate both of said photoconductive devices for calibrating said apparatus.

2. The device of claim 1 and further comprising means coupled to said leads for simultaneously utilizing the electrical characteristics of said photoconductive devices.

3. The device of claim 1 and further comprising means coupled to said leads for taking the ratio of the characteristic of said second photoconductive device and the characteristic of said first photoconductive device and utilizing said ratio.

4. The device of claim 1 wherein the conductivity of said photoconductive devices varies as a function of light energy received thereby, and further comprising means coupled to said leads for dividing the conductivity of said second photoconductive device by the conductivity of said first photoconductive device, and means coupled to said dividing means for indicating said division.

5. The device of claim 4 wherein said shielding means and the interior of said chamber have light absorbing surfaces.

6. The apparatus of claim 4 wherein said dividing means comprise an operational amplifier.

References Cited

UNITED STATES PATENTS

| | | |
|---|---|---|
| 3,037,421 | 6/1962 | Bigelow et al. |
| 3,202,826 | 8/1965 | Greathouse. |
| 3,234,846 | 2/1966 | Cropper et al. |
| 3,248,551 | 4/1966 | Frommer. |
| 3,358,148 | 12/1967 | Conklin _____ 250—218 |

FOREIGN PATENTS

| | | |
|---|---|---|
| 1,115,477 | 10/1961 | Germany. |

RALPH G. NILSON, Primary Examiner

M. ABRAMSON, Assistant Examiner

U.S. Cl. X.R.

356—208